United States Patent
Punjabi (10) Patent No.: US 7,616,758 B2
(45) Date of Patent: Nov. 10, 2009

(54) METHOD AND SYSTEM FOR IMPLEMENTING AN INTELLIGENT REDIAL SYSTEM

(75) Inventor: Anil Punjabi, San Jose, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 513 days.

(21) Appl. No.: 10/227,100

(22) Filed: Aug. 23, 2002

(65) Prior Publication Data
US 2004/0037404 A1   Feb. 26, 2004

(51) Int. Cl.
*H04M 1/00* (2006.01)

(52) U.S. Cl. .............................. 379/355.01; 379/355.05; 379/355.08; 455/564

(58) Field of Classification Search ............ 379/201.01, 379/355.01, 8
See application file for complete search history.

(56) References Cited

U.S. PATENT DOCUMENTS

| | | | |
|---|---|---|---|
| 4,661,977 A | 4/1987 | Howett | |
| 5,029,197 A | 7/1991 | Hashimoto | |
| 5,592,538 A * | 1/1997 | Kosowsky et al. | 379/93.08 |
| 5,612,993 A | 3/1997 | Hanaoka et al. | |
| 5,689,557 A | 11/1997 | Kaplan | |
| 5,754,602 A | 5/1998 | Landry et al. | |
| 5,832,074 A * | 11/1998 | Chang et al. | 379/355.05 |
| 5,835,571 A * | 11/1998 | Johnson | 379/88.01 |
| 5,909,484 A | 6/1999 | Kim | |
| 5,963,636 A | 10/1999 | Boakes | |
| 5,966,436 A * | 10/1999 | Kim | 379/216.01 |
| 6,167,130 A | 12/2000 | Rosen | |
| 6,246,989 B1 * | 6/2001 | Polcyn | 704/275 |
| 6,385,313 B1 | 5/2002 | Schneider-Hufschmidt et al. | |
| 6,504,917 B1 * | 1/2003 | Flint et al. | 379/93.01 |
| 6,608,895 B1 * | 8/2003 | Avidan | 379/355.01 |
| 6,804,508 B1 * | 10/2004 | Yamada | 455/414.1 |
| 7,020,280 B2 * | 3/2006 | Wang | 379/418 |
| 7,065,188 B1 * | 6/2006 | Mei et al. | 379/88.23 |
| 7,317,789 B2 * | 1/2008 | Comerford | 379/88.18 |
| 2001/0040961 A1 * | 11/2001 | Wang | 379/355.01 |

FOREIGN PATENT DOCUMENTS

JP            05122220 A  *  5/1993

\* cited by examiner

*Primary Examiner*—Temica M Beamer (57) ABSTRACT

The present invention is directed to a system and method for implementing an intelligent redial system. A method for storing redial data for a connection between a user phone system and a remote phone system may include establishing a connection with the remote phone system by the user phone system. A timer is started in response to the established connection. At least one digit is dialed by a user and corresponding time data of the timer with the dialed digit is monitored. The monitored digit and corresponding time data is stored. The stored monitored digit and corresponding time data are suitable for performing a redial.

15 Claims, 9 Drawing Sheets

METHOD AND SYSTEM FOR IMPLEMENTING AN INTELLIGENT REDIAL SYSTEM

BACKGROUND OF THE INVENTION

The present invention relates generally to telephone connections and particularly, to a method and system for implementing an intelligent redial system.

Telephone communication is one of the most utilized forms of communication over a distance between users. There is no more time honored and universal method of communication utilized that allows users to communicate with each other from nearly anywhere in the world. However, the very success and prevalence of telephone communication has necessitated ways to organize the sheer volume of calls so that users may be routed to a desired destination in an efficient manner.

One such method involves the use of menus which are selectable by a user to navigate to a desired destination. For instance, a user may call a store and wish to speak with someone about a certain product, and therefore navigate through menus which give the user selections between departments. Such menus have been utilized to reduce and even eliminate the amount of phone operators located on the premises of businesses utilizing the menus. However, although the menus may be efficient and cost effective to a business or other organization utilizing the menus, the application of the menus has increased both the time required by a user to talk to a desired person and has increased the level of frustration of a caller to such an establishment.

Telephones may provide a redial function to enable a user to redial a number previously entered. For instance, a telephone may store digits entered by a user, such as numeric and symbol digits, entered by a user to dial a telephone number. If the user was unsuccessful in gaining a connection, wanted to re-establish a connection, and the like, the user may then press a redial key so that the telephone would automatically reenter the previously stored digits. However, such systems were unsuitable for navigation through phone menus encountered, thereby requiring a user to once again engage in what may be a tedious task of entering digits in response to queries. For instance, the system may merely play back all the numbers entered without waiting for the correct menu to be accessed for each digit entry. Such entry may be further hampered by systems which do not allow a user to enter a selection during the query, but rather force a user to wait until all the options are given before a selection can be made.

Therefore, it would be desirable to provide a system and method for implementing an intelligent redial system.

SUMMARY OF THE INVENTION

Accordingly, the present invention is directed to a system and method for implementing an intelligent redial system.

In a specific embodiment of the present invention, a method for storing redial data for a connection between a user phone system and a remote phone system includes establishing a connection with the remote phone system by the user phone system. A timer is started in response to the established connection. At least one digit dialed by a user and corresponding time data of the timer with the at least one dialed digit is monitored. The monitored digit and corresponding time data is stored, the stored monitored digit and corresponding time data are suitable for performing a redial.

In a specific embodiment of the present invention, a phone system for storing redial data for a connection with a remote phone system includes a memory, a timer, an input device suitable for dialing a digit by a user, a connection device for communicatively connecting with a remote phone system and a processor. The processor is communicatively coupled to the timer, the input device, the connection device, and the memory. The processor is suitable for performing a program of instructions which configures the processor to establish a connection with a remote phone system, start the timer in response to the established connection, monitor at least one digit dialed by a user utilizing the input device and corresponding time data of the timer with the at least one dialed digit, and store the monitored digit and corresponding time data, wherein the stored digit and corresponding time data is suitable for performing a redial.

In an additional specific embodiment of the present invention, a method for implementing a redial for a connection between a user phone system and a remote phone system includes monitoring at least one digit dialed by a user and a corresponding time the digit was dialed. The monitored digit is stored and corresponding time data are stored and a redial process is initiated based on the stored digit and corresponding time data. The initiated redial process is interrupted by a user dialed digit.

In a further specific embodiment of the present invention, a phone system for redialing data for a connection with a remote phone system includes a memory, a timer, an input device suitable for dialing a digit by a user, a connection device for communicatively connecting with a remote phone system and a processor. The processor is communicatively coupled to the timer, the input device, the connection device, and the memory. The processor is suitable for performing a program of instructions which configures the processor to monitor at least one digit dialed by a user utilizing the input device and a corresponding time the digit was dialed as indicated by the timer. The monitored digit and corresponding time data is stored and a redial process is initiated based on the stored digit and corresponding time data. The initiated redial process is interrupted based on a user dialed digit.

It is to be understood that both the foregoing general description and the following detailed description are exemplary and explanatory only and are not necessarily restrictive of the invention claimed. The accompanying drawings, which are incorporated in and constitute a part of the specification, illustrate an embodiment of the invention and together with the general description, serve to explain the principles of the invention.

DETAILED DESCRIPTION OF THE SPECIFIC EMBODIMENTS

Reference will now be made in detail to the presently preferred embodiments of the invention, examples of which are illustrated in the accompanying drawings.

Referring generally now to FIGS. 1A through 8, exemplary embodiments of the present invention are shown. Telephones may provide a redial function to enable a user to redial a number previously entered. For instance, a telephone may store digits entered by a user, such as numeric and symbol digits, which were entered by a user to dial a telephone number. If the user was unsuccessful in gaining a connection, wanted to re-establish a connection, and the like, the user may then press a redial key so that the telephone would automatically re-enter the previously stored digits.

However, previous systems may be unsuitable for navigation through encountered phone menus, thereby requiring a user to once again engage in what may be a tedious task of entering digits in response to queries. In some instances, the redial function may not be able to store more digits than the length of the telephone number, and may even overwrite the stored telephone number with the additional digits. Additionally, a system may merely play back all the numbers entered without waiting for the correct menu to be accessed for each digit entry. Such entry may be further hampered by systems which do not allow a user to enter a selection during the query, but rather force a user to wait until all the options are given before a selection can be made. However, by utilizing the present invention, an intelligent redial system is provided which may enable improved navigation through menus and increased user selectability of redial implementation.

Figure 1A:
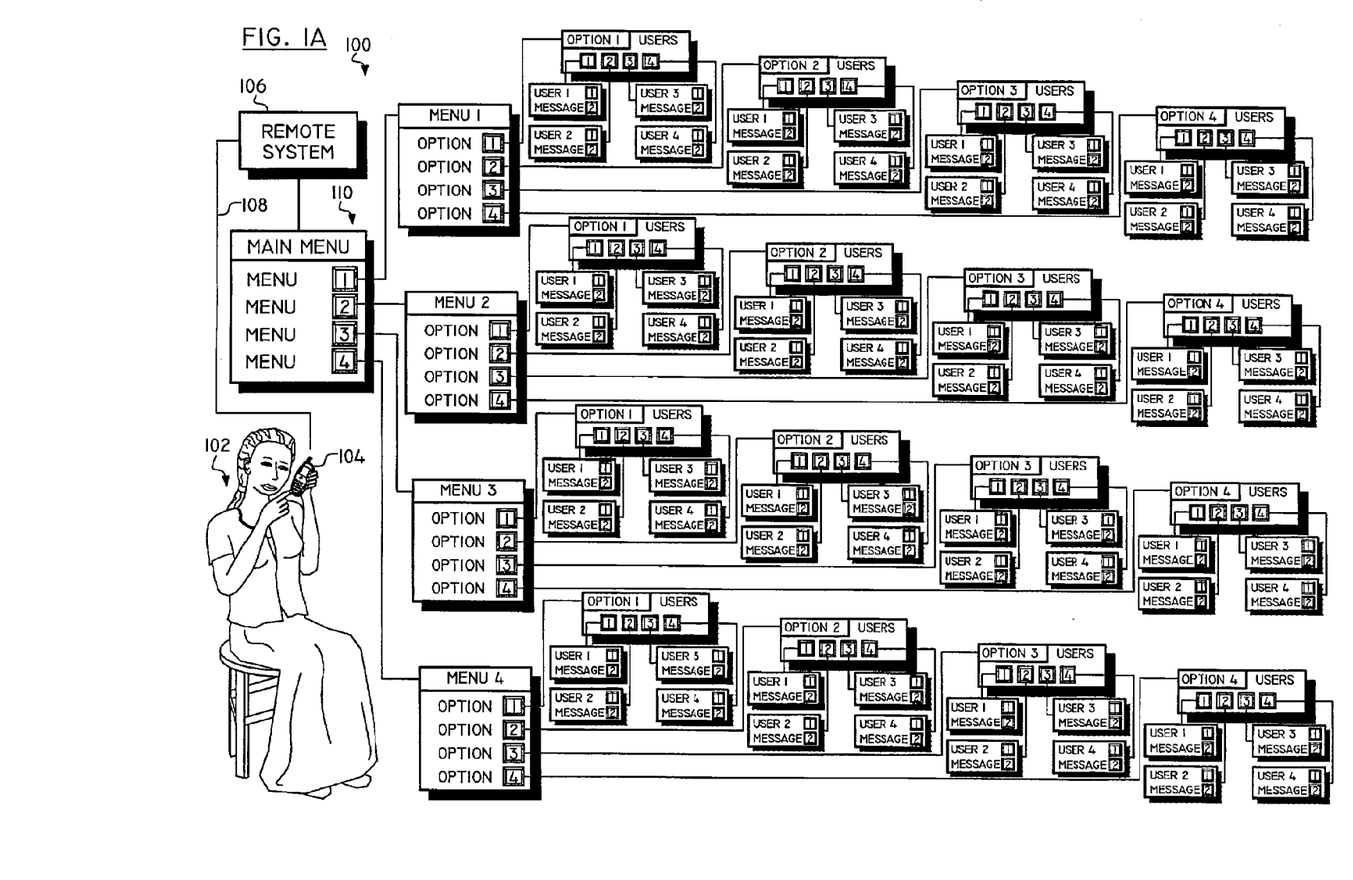
FIG. 1A is an illustration depicting an embodiment of the present invention wherein a user accesses a phone menu over a telephone connection to communicate with a desired location.

Referring now to FIG. 1A, an exemplary embodiment 100 of the present invention is shown wherein a user accesses a phone menu over a telephone connection to communicate with a desired location. A user 102 may utilize a telephone 104 to communicate with a remote phone system 106 over a telephone connection 108. The remote phone system 106 may include a phone menu 110. The phone menu 110 may include a variety of selections to be made by a user 102 to access a desired connection, person, data and the like. For instance, the phone menu may be provided by a charge service provider, such as for calling cards and collect calls; may be provided by a business to organize department access; service provided to gain personal data such as medical, banking, insurance, and the like; and other uses as contemplated by a person of ordinary skill in the art.

As is readily apparent in FIG. 1A, the sheer number of menu choices may result in a time consuming navigation process. Such a process may become even more troublesome if the user 102 becomes disconnected from the remote phone system 106, such as due to a failure of the connection 108, inadvertent hang-up by a person of the remote phone system 106, wrong digit entry by the user 102, and the like. However, through use of the present invention, the navigation by the user 102 through the phone menu 110 may be monitored and stored, so that a redial process may be initiated to return a user to a desired point in the phone menu 110 on the remote phone system 106.

Figure 1B:
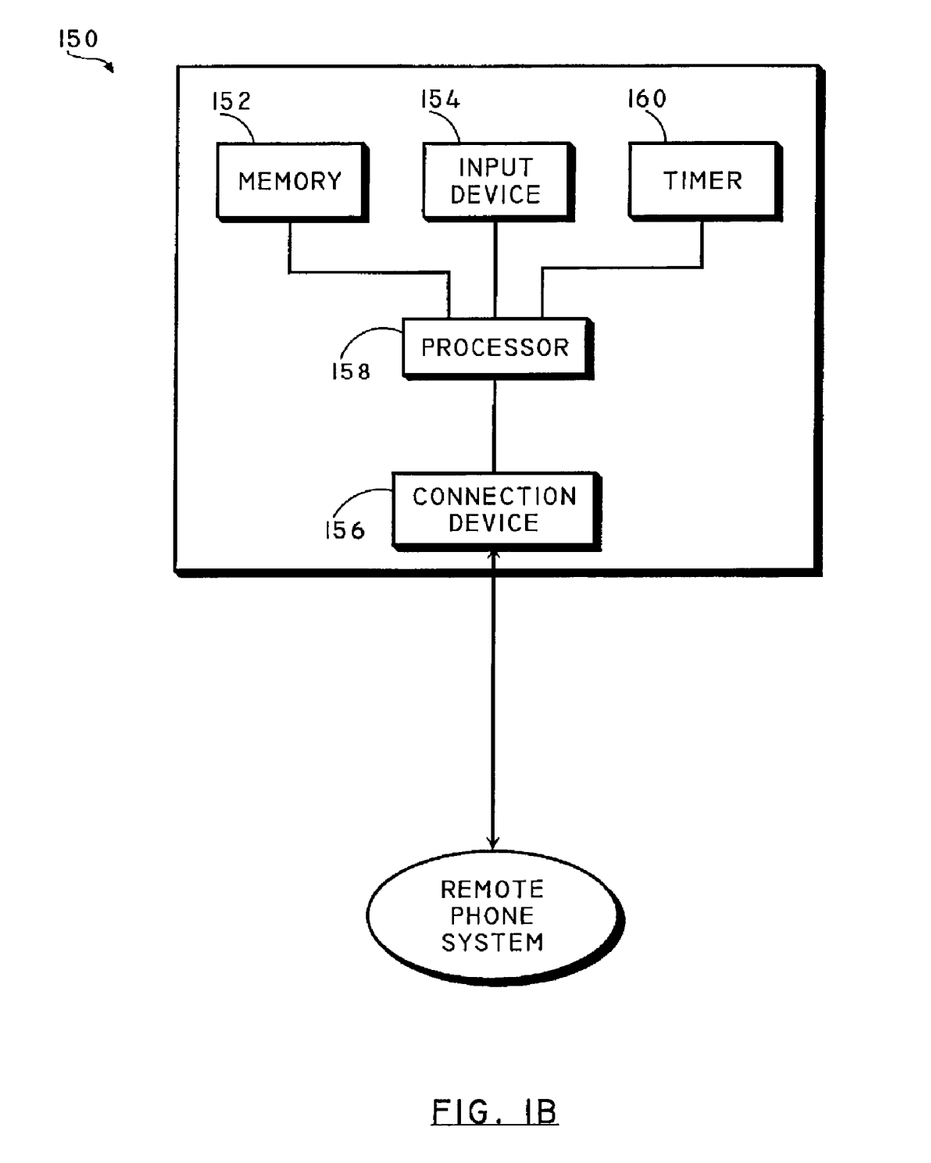
FIG. 1B is a block diagram of an exemplary phone system operable to employ the present invention.

A phone system of the present invention may be configured in a variety of ways without departing from the spirit and scope of the present invention. For example, as shown in FIG. 1B, a phone system 150 may include a memory 152, an input device 154 suitable for dialing of digits by a user, a connection device 156 for communicatively connecting with a remote phone system, and a processor 158 for controlling operation of the phone system 150. A timer 160 may also be included for accurate storage of data describing the use of the phone system 150.

Figure 2:
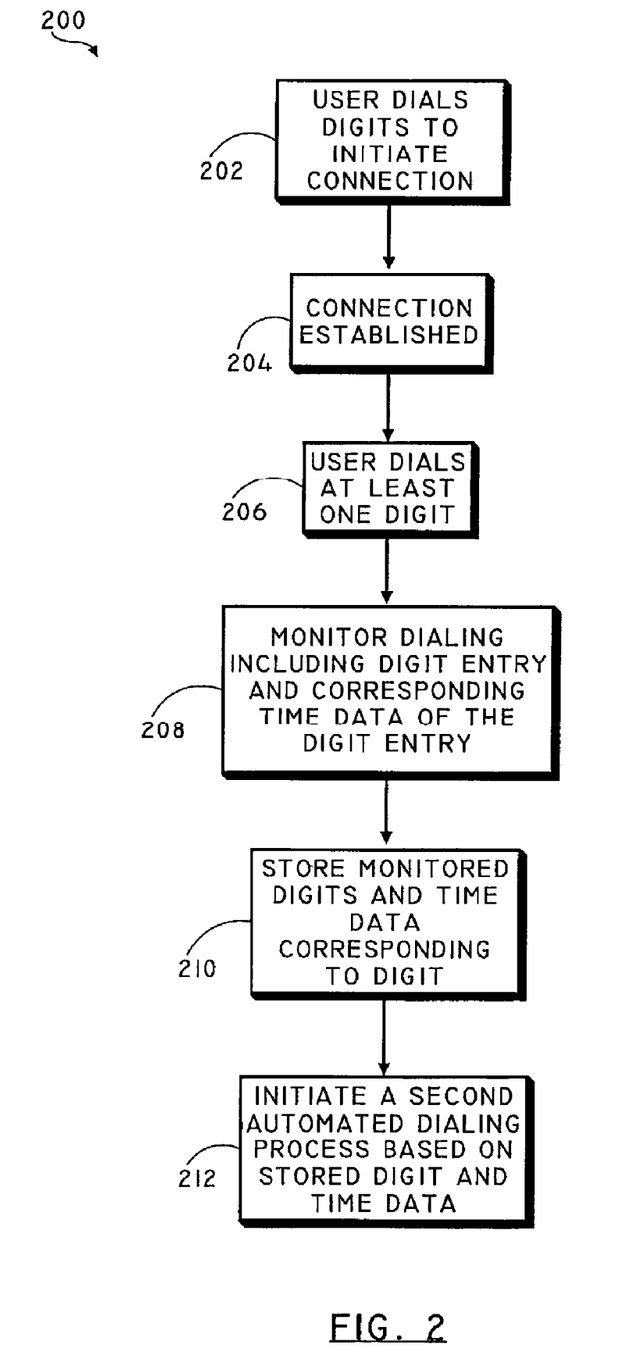
FIG. 2 is a flow diagram illustrating an exemplary method of the present invention wherein user dialing of digits is monitored and stored to be utilized during an automated dialing process based on the stored entry of the data.

Referring now to FIG. 2, an exemplary method 200 of the present invention is shown wherein user dialing of digits is monitored and stored, so as to be utilized later during an automated dialing process based on stored dialing of the data. A user dials digits to initiate a connection 202, such as by dialing a telephone number. Once the connection is established 204, the user dials at least one digit 206, such as to enter a personal identification number (PIN), navigate through a menu, and the like. The user phone system monitors the dialing of the at least one digit, including monitoring corresponding time data of dialing of the digit 208. The user phone system then stores the monitored digits and time data corresponding to digit dialing 210.

Therefore, if a user wishes to initiate a second automated dialing process, the stored digit and corresponding time data may be utilized 212 to navigate as previously accomplished by the user. In this way, through use of the stored digits and time data, a user it not forced to re-navigate through a plurality of windows, reenter a PIN, and the like, but may proceed directly to the desired call destination in an efficient and easy manner.

Figure 3:
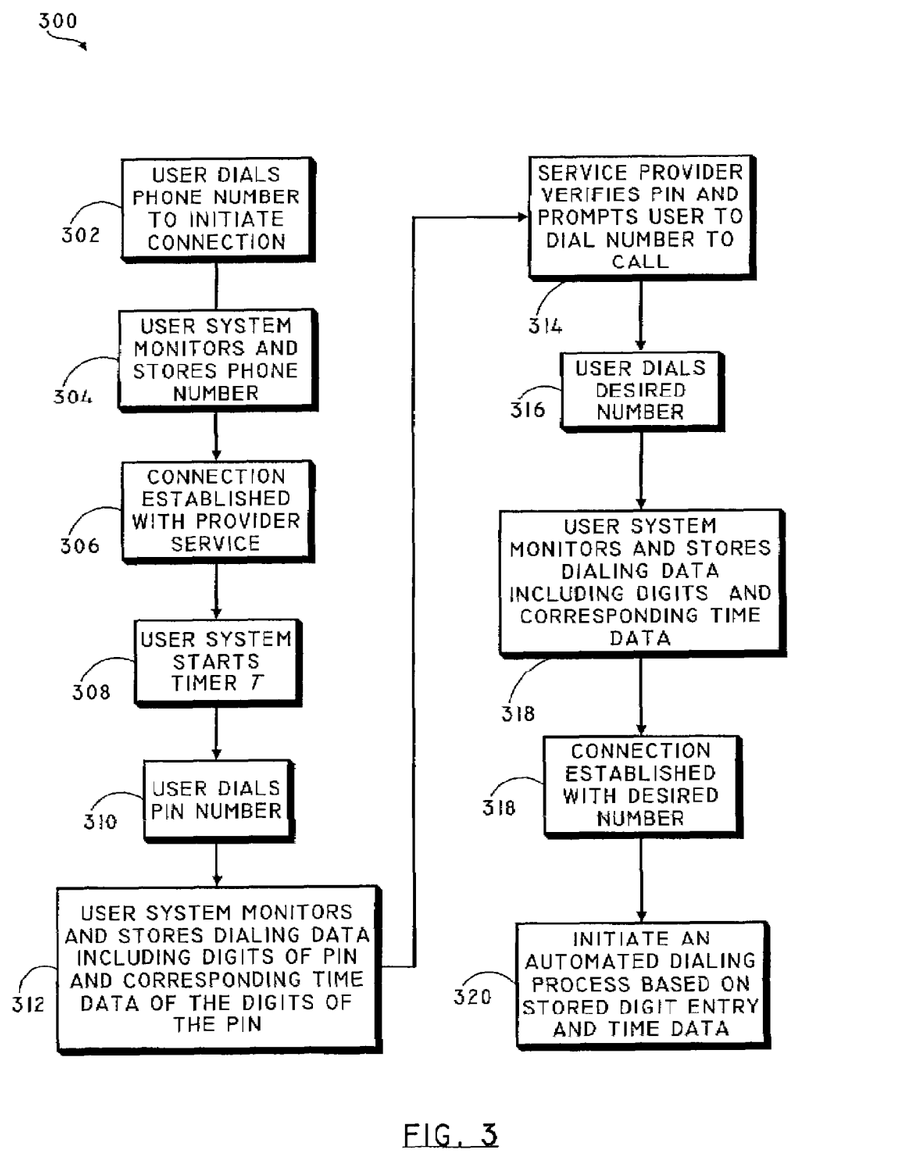
FIG. 3 is a flow diagram depicting an exemplary method of the present invention wherein data, entered after a connection is established which includes monitored user entry of digits and corresponding time data, is stored to enable automated redialing.

Referring now to FIG. 3, an exemplary method 300 of the present invention is shown wherein data, dialed after a connection is established and includes monitored user dialing of digits and corresponding time data, is stored to enable automated redialing. A user dials a phone number to initiate a connection in step 302 with a remote phone system, such as a 1-800 number to access a provider service for collect calls, calling-card calls, and the like. The user phone system monitors and stores the phone number dialed in step 304. A connection is then established with the provider service in step 306.

The user phone system detects the connection and starts a timer, T, in step 308. The remote phone system may then prompt the user to enter additional information. For example, in this case, the provider service may ask for a PIN number. The user may then dial the pin number in step 310 in response to the prompt. The user phone system monitors and stores dialing data including digits of pin entry and corresponding time data of the digits of the pin entry in step 312.

For instance, once the connection is established, the service provider may output a message welcoming the user to the service, and ask for entry of a PIN number. At this point in time, fifteen seconds may have passed. Once the user starts dialing the PIN number, the user phone system may monitor the time delay as registered by Timer T and create a record set, such as (Delay, Dialed digits), where the delay is expressed as the following:

(minutes::seconds::milliseconds)

The dialed digits may be expressed as the digit actually dialed and registered by the system. Therefore, if the user is dialing a five digit PIN number, such as 54321, the user phone system would record the digits and the time delay. The record sets may be created as shown below and stored with the originally monitored phone number 304 as follows:

i). Original Number (18001234567)
ii). (00::15::00,5)
iii). (00::15::04,4)
iv). (00::16::02,3)
v). (00::16::09,2)
vi). (00::17::07,1)

Thus, in this embodiment, the user phone system does not need to record the time data until the data is relevant, i.e., needed for implementing a redial.

The service provider may then verify the PIN and prompt the user to enter a number to call in step 314. The user phone system may still keep the timer active at this point. Therefore, once the user enters the desired number in step 316, the user phone system may monitor and store dialing data including digits and corresponding time data in step 318. For example, a user may enter a phone number which is stored as follows:

vii). (00::27::07,7)
viii). (00::27:: 17,0)
ix). (00::28::03,3)
x). (00::28::12,5)
xi). (00::28::18,5)
xii). (00::29::03,5)
xiii). (00::29::10,1)
ivx). (00::29::16,2)
xv). (00::30::07,1)
xvi). (00::30::17,2)

At this point, the connection is established with a desired number in step 320. If the user wishes to re-establish the connection, an automated dialing process may be initiated based on stored digit dialing and time data in step 322. Once the call is completed, the user may choose from a variety of options for storing and accessing the stored call data, such as saving as a speed dial number, saving in an address book and utilizing a user-friendly name, save automatically as a last number redial, and the like as contemplated by a person of ordinary skill in the art. For instance, a user may then redial the number at which point the user phone system dials the original number, and once the call is established, enters the digits as recorded, enters at a reduced time (increased rate) to further improve efficiency, and the like.

Figure 4:
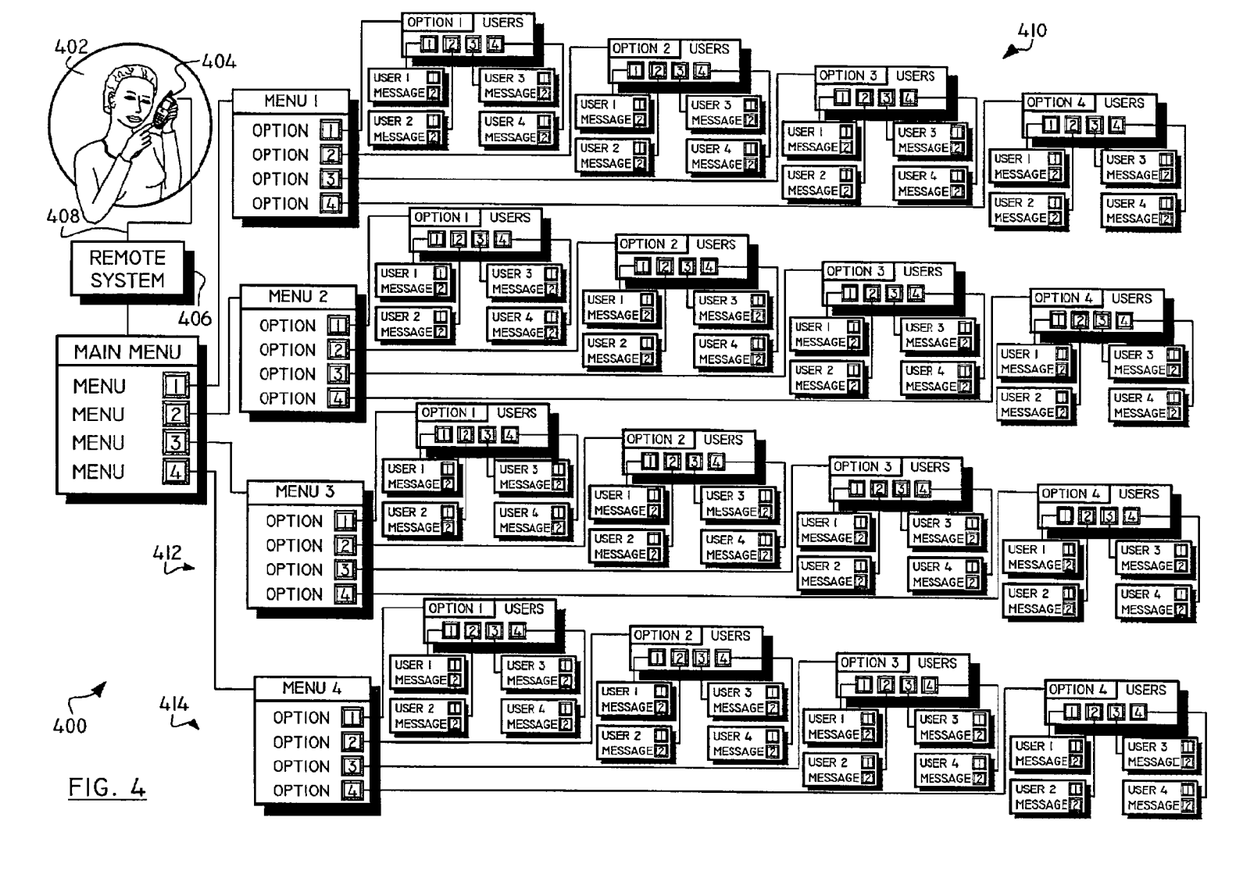
FIG. 4 is an illustration of an exemplary embodiment of the present invention wherein an intelligent redial system allows an interrupt during redial of a call.

Referring now to FIG. 4, an exemplary embodiment 400 of the present invention is shown wherein the intelligent redial system of the present invention allows an interrupt during redial of a call. A user 402 may utilize a telephone 404 to access a remote phone system 406 over a connection 408 to access desired data, such as insurance information. The remote phone system 406 may employ a phone menu 410 to enable the user to navigate through the menu to obtain desired information without having to utilize an operator. However, during the navigation through the phone menu 410, the user 402 may navigate to an undesirable location in the phone menu 410. For instance, a user may progress down a first "branch" of the menu 410, for example by selecting options from "MENU 3" 412, to obtain desired information through a series of dialed digits as previously described, but that branch may not contain the desired data. Navigating back through the first branch to a second branch, for example, to select options from "MENU 4" 414, may be difficult if not impossible to achieve, based on the format of the menu 410 system. However, through use of the present invention, the redial process may be interrupted by the user so that a user may continue in a new direction if desired.

Figure 5:
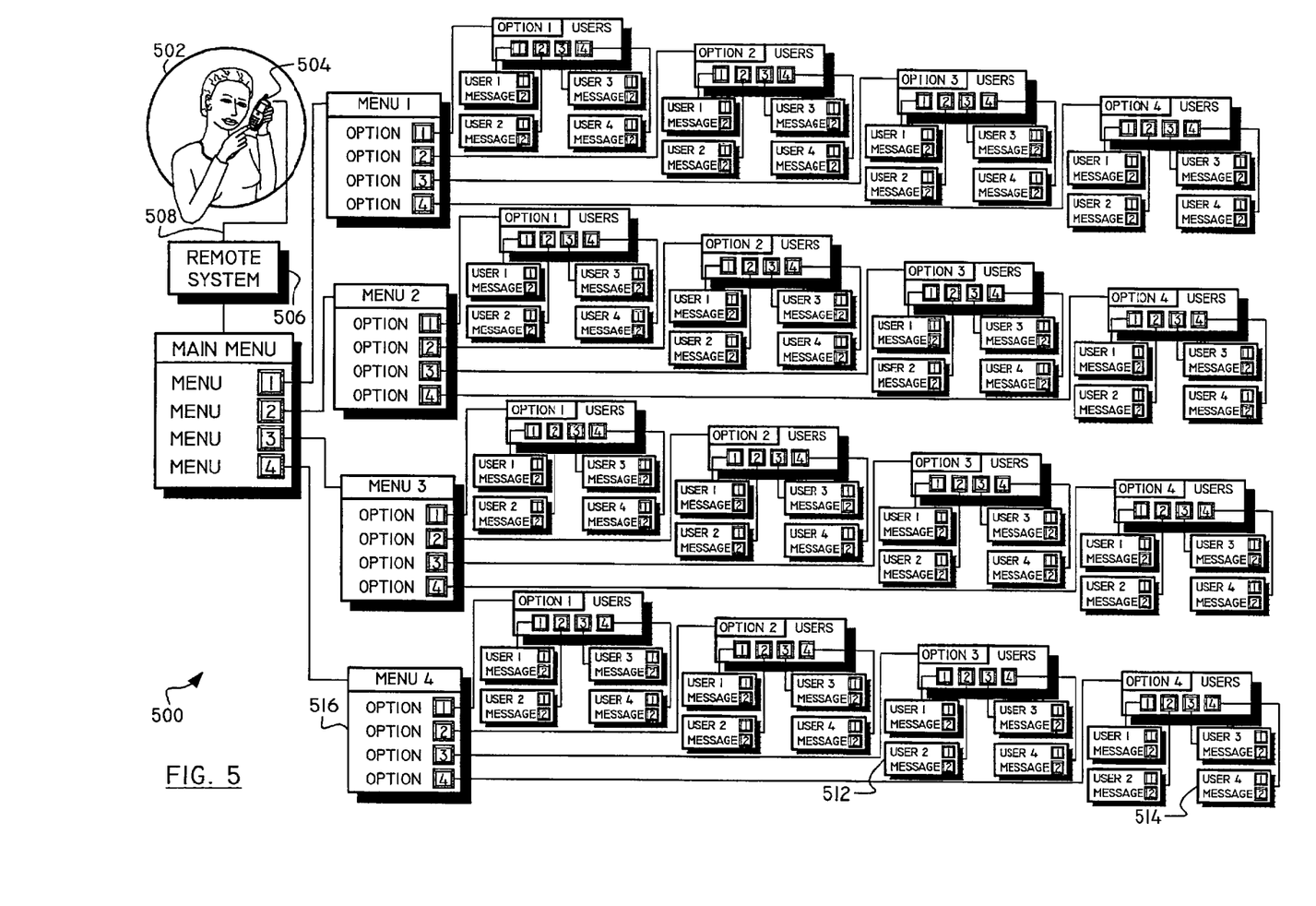
FIG. 5 is an illustration of an exemplary embodiment of the present invention wherein a user interrupts a redial process to navigate through a new path of a phone menu system.

For example, as shown in FIG. 5, an exemplary embodiment 500 of the present invention is shown wherein a user interrupts a redial process to navigate through a new path of a phone menu system. A user 502 utilizes a telephone 504 to access a remote phone system 506 over a connection 508 to access desired data 512. However, during user navigation through the menu 510, the user may take an incorrect "route", and therefore arrive at a menu 514 from which the desired data 512 is not accessible.

The user 502 may then reinitiate the call through use of the present invention and regain a connection with the remote phone system 506. However, during a previous decision point 516, the user may enter a digit different from the previously dialed digit. That digit may then override the redial process, and allow the user to continue toward the desired data 512. In this way, the present invention allows for increased user selectability thereby increasing efficiency and ease of control.

Figure 6:
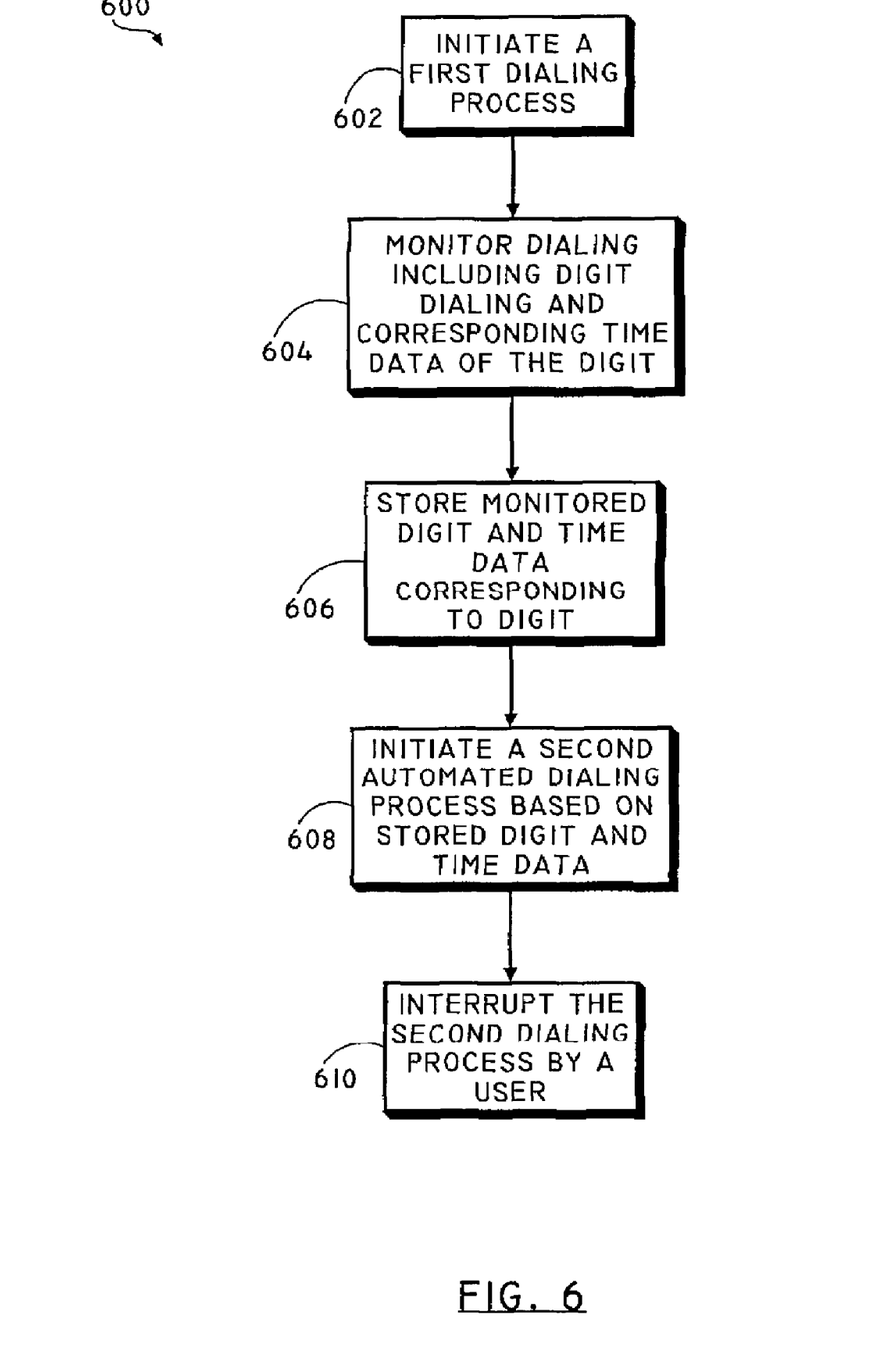
FIG. 6 is a flow diagram depicting an exemplary method of the present invention wherein a redial process having previously stored data is interrupted.

Referring now to FIG. 6, an exemplary method 600 of the present invention is shown wherein a redial process having previously stored data is interrupted. A first dialing process is initiated by a user in step 602. The dialing is monitored including monitoring digits dialed and corresponding time data of the dialed digits in step 604. Digits and time data corresponding to digit are stored in step 606.

A second automated dialing process is initiated based on the stored digit and time data in step 608. The second dialing process is then interrupted by a user in step 610, such as by entering a key, speaking a new digit for menu selection, and the like. Although storing corresponding data in this exemplary method is discussed, it should be apparent to a person of ordinary skill in the art that embodiments in which just the digit dialing data is stored are contemplated without departing from the spirit and scope of the present invention.

The previous embodiment discussed an example in which a user interrupted the dialing process as it was implemented to make a new selection. It is also contemplated by the present invention that a user may pre-select the point to which the user wishes the redial process to progress.

Figure 7:
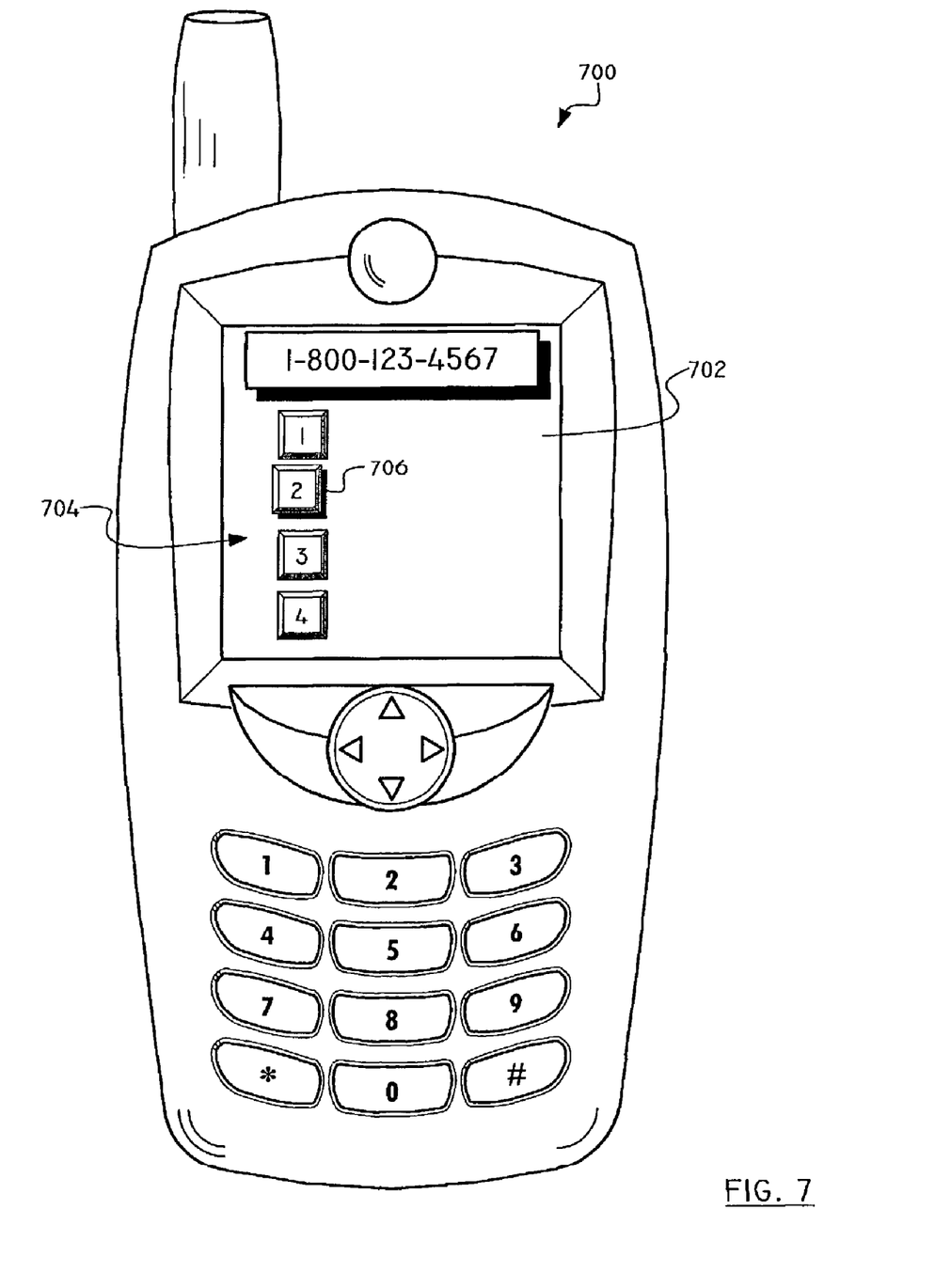
FIG. 7 is an illustration of an exemplary embodiment of the present invention wherein a display of redial steps is provided to allow a user to select a step for the redial process to progress for dialing.

For example, referring now to FIG. 7, an exemplary embodiment 700 of the present invention is shown wherein a display of redial steps is provided to allow a user to select a step for the redial process to progress for dialing. A user phone system may include a display 702 showing the redial steps 704 which were stored based on the monitored utilization. A user is able to select one of the redial steps 706, such as through use of a cursor control device, touch screen, and the like as contemplated by a person of ordinary skill in the art, to which the redial process will progress.

For instance, a user may wish to make another collect call or calling card call. Thus, the user may select a point on the redial process where the service is dialed and user information dialed, but will permit a user to enter a new phone number. Similar uses may be realized utilizing phone menus as previously discussed. In this way, the user phone system may automatically progress to the indicated point in the dial process without user intervention, thereby resulting in an efficient and convenient system.

Figure 8:
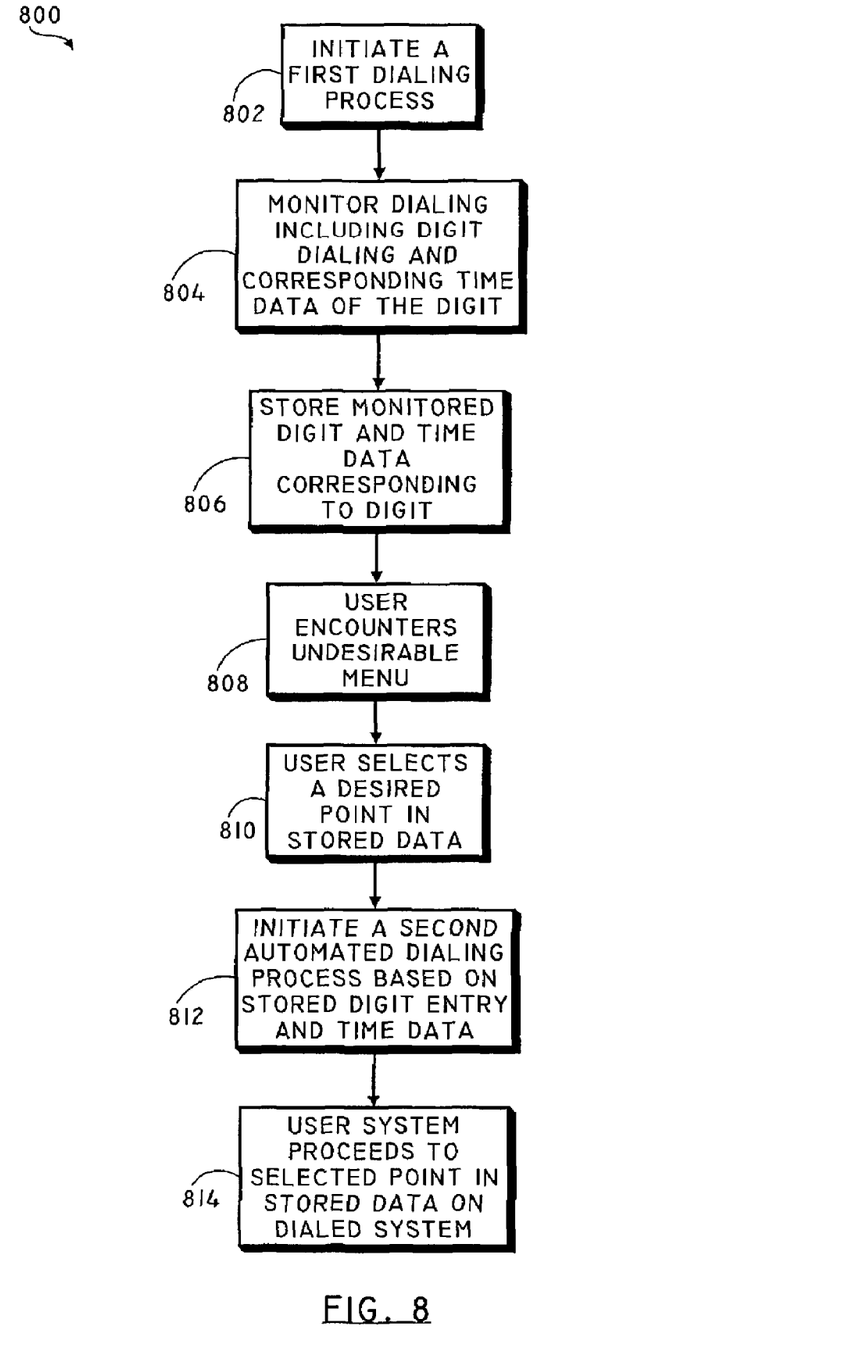
FIG. 8 is a flow diagram illustrating an exemplary method of the present invention wherein a user pre-selects a point to progress to in a redial process.

Referring now to FIG. 8, an exemplary method 800 of the present invention is shown wherein a user pre-selects a point to progress to in a redial process. A user initiates a first dialing process in step 802. The dialing is monitored, including digit dialing and corresponding time data of the digit dialing in step 804, and stored in step 806. The user then accesses a phone menu, during which the user encounters an undesirable menu in step 808. The user at this point may be unable to backtrack to a previous menu, not wish to do so because of the complications in performing the operation, and the like.

Therefore, the user may select a desired point in step 810 in a redial process to return, and initiate a second automated dialing process based on the stored digit dialing and time data in step 812. The user phone system then automatically proceeds to the selection point in the stored data on the dialed system in step 814 without user intervention, at which point, the user may then progress as desired.

It should be apparent that the present invention is compatible with a wide range of communication standards, including Time Division Multiplexing, Internet Protocol (TDM, IP) based, such as H.323 and Session Initiation Protocol (SIP), and the like as contemplated by a person of ordinary skill in the art.

Although the invention has been described with a certain degree of particularity, it should be recognized that elements thereof may be altered by persons skilled in the art without departing from the scope and spirit of the invention. It is understood that the specific orders or hierarchies of steps in the methods illustrated are examples of exemplary approaches. Based upon design preferences, it is understood that the specific orders or hierarchies of these methods can be rearranged while remaining within the scope of the present invention. The accompanying method claims present elements of the various steps of methods in a sample order, and are not meant to be limited to the specific order or hierarchy presented.

It is believed that the scope of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A phone system for storing redial data within a telephone for a connection with a remote phone system, comprising:
    a telephone, said telephone including:
        a memory suitable for storing a program of instructions;
        a timer;
        an input device suitable for dialing a digit by a user;
        a connection device for communicatively connecting with a remote phone system: and
        a processor communicatively coupled to the timer, the input device, the connection device, and the memory, the processor suitable for performing a program of instructions which configures the processor to
        establish a connection with a remote phone system;
        start the timer in response to the established connection;
        monitor at least one digit dialed by a user utilizing the input device and corresponding time data of the timer with the at least one dialed digit from a beginning of the established connection;
        store the monitored digit and corresponding time data, wherein the stored digit and corresponding time data is suitable for performing a redial;
        initiate a redial process based on the stored digit dialed and corresponding time data;
        display a plurality of redial steps to the user, the plurality of redial steps corresponding to combinations of digits based upon the stored digit dialed and corresponding time data for allowing the user to select at least one of the plurality of recital steps as a point to which the redial process is to progress; and
        pause the redial process when the redial process reaches the redial step, wherein the plurality of redial steps are displayed to the user before the redial process is initiated.

2. The phone system as described in claim 1, further comprising monitoring digit dialed by a user to establish a connection with a remote phone system.

3. The phone system as described in claim 2, wherein digit dialed is a phone number.

4. The phone system as described in claim 1, further comprising interrupting the initiated redial process by a user dialed digit.

5. A method, executed by a telephone, for implementing a redial for a connection between a user phone system and a remote phone system, comprising:
    monitoring a first digit dialed by a user on a telephone and a corresponding time the first digit was dialed from a beginning of an established connection;
    storing the monitored first digit and corresponding dine data in memory of said telephone;
    displaying a redial step to the user on a display of said telephone, the redial step corresponding to the first digit dialed by the user for allowing the user to select the redial step as a point to which the redial process is to progress and pausing the redial process when the redial process reaches the redial step;
    initiating a redial process based on the stored first digit and corresponding time data for establishing a second connection with the remote phone system, the redial step displayed to the user before the redial process is initiated; and
    interrupting the initiated redial process upon entry of a second digit by the user at a point in the redial process where the first digit is to be entered by the redial process, the second digit being entered in place of the first digit, wherein the second digit overrides the initiated redial process.

6. The method as described in claim 5, further comprising monitoring a plurality of digits dialed by user to establish a connection with a remote phone system, wherein the connection is established based on the plurality of digits dialed.

7. The method as described in claim 6, wherein the plurality of digits dialed is a phone number.

8. The method as described in claim 5, wherein the first digit is dialed after a connection is established between the user phone system and the remote phone system.

9. A phone system for redialing data stored within a telephone for a connection with a remote phone system, comprising:
    a telephone, said telephone including:
        a memory suitable for storing a program of instructions;
        a timer;
        an input device suitable for dialing of a digit by a user;
        a connection device for communicatively connecting with a remote phone system;
        and
        a processor communicatively coupled to the timer, the input device, the connection device, and the memory, the processor suitable for performing a program of instructions which configures the processor to monitor a first digit dialed by a user and a corresponding time the first digit was dialed as indicated by the timer from a beginning of an established connection;

store the monitored first digit and corresponding time data;

initiate a redial process based on the stored first digit and corresponding time data for establishing a second connection with the remote phone system;

interrupt the initiated redial process upon entry of a second digit by the user at a point in the redial process where the first digit is to be entered by the redial process; and enter the second digit in place of the first digit, wherein the second digit overrides the initiated redial process, wherein the processor displays a redial step to the user, the redial step corresponding to the first digit dialed by the user for allowing the user to select the redial step as a point to which the radial process is to progress and pausing the redial process when the radial process reaches the redial step, wherein the redial step is displayed to the user before the redial process is initiated.

10. The phone system as described in claim 9, further comprising monitoring a plurality of digits dialed by a user to establish a connection with a remote phone system, wherein the connection is established based on the plurality of digits dialed.

11. The phone system as described in claim 10, wherein the plurality of digits dialed is a phone number.

12. The phone system as described in claim 9, wherein the first digit is dialed after a connection is established between the user phone system and the remote phone system.

13. The phone system as described in claim 9, wherein said timer measures dialing of digits according to a minute, second and millisecond format.

14. The phone system as described in claim 9, wherein said redial process redials digits at a reduced time.

15. The phone system as described in claim 9, wherein said redial process is stored in said memory of said telephone by a user-selected name.

* * * * *